(12) United States Patent
Wang (10) Patent No.: US 9,522,460 B2
(45) Date of Patent: Dec. 20, 2016

(54) RATCHET WRENCH ACTUATOR STRUCTURE

(71) Applicant: Yeo Ming Wang, Taipei (TW)

(72) Inventor: Yeo Ming Wang, Taipei (TW)

( * ) Notice: Subject to any disclaimer, the term of this patent is extended or adjusted under 35 U.S.C. 154(b) by 218 days.

(21) Appl. No.: 14/308,589

(22) Filed: Jun. 18, 2014

(65) Prior Publication Data

US 2015/0202747 A1 Jul. 23, 2015

(30) Foreign Application Priority Data

Jan. 21, 2014 (TW) .............................. 103102129 A (51) Int. Cl.
*B25B 13/46* (2006.01)
*F16F 1/04* (2006.01)

(52) U.S. Cl.
CPC ........... *B25B 13/463* (2013.01); *B25B 13/465* (2013.01); *B25B 13/466* (2013.01); *F16F 1/047* (2013.01)

(58) Field of Classification Search
CPC ...... B25B 13/463; B25B 13/46; B25B 13/462; B25B 23/0035; B25B 13/465; B25B 15/04; B25B 13/466; F16F 1/047
USPC .................................................... 81/60–63.2
See application file for complete search history.

(56) References Cited

U.S. PATENT DOCUMENTS

| | | | | |
|---|---|---|---|---|
| 3,265,171 A * | 8/1966 | Kilness | ................. | B25B 13/463 192/43.2 |
| 5,964,129 A * | 10/1999 | Shiao | .................... | B25B 13/463 81/58 |
| 6,282,991 B1 | 9/2001 | Hu | | |
| 6,516,691 B1 * | 2/2003 | Wei | ....................... | B25B 13/463 81/63 |
| 6,629,477 B2 * | 10/2003 | Ling | ..................... | B25B 13/463 81/63 |
| 6,745,647 B2 * | 6/2004 | Wang | .................... | B25B 13/481 81/60 |
| 6,758,641 B2 * | 7/2004 | Hu | ........................ | B25B 13/463 408/60 |
| 7,185,566 B2 * | 3/2007 | Arnold | ................. | B25B 13/468 81/63 |
| 7,237,460 B2 * | 7/2007 | Hu | ........................ | B25B 13/463 192/43.2 |
| 8,485,069 B1 * | 7/2013 | Chen | ..................... | B25B 13/463 81/60 |
| 8,522,652 B2 * | 9/2013 | Wang | .................... | B25B 13/463 81/60 |
| 8,763,498 B2 * | 7/2014 | Hsieh | .................... | B25B 13/463 192/43.2 |

(Continued)

FOREIGN PATENT DOCUMENTS

TW 413113 U 11/2000

*Primary Examiner* — Hadi Shakeri
*Assistant Examiner* — Danny Hong
(74) *Attorney, Agent, or Firm* — Muncy, Geissler, Olds & Lowe, P.C.

(57) ABSTRACT

A ratchet wrench actuator structure has a head part and a shank part, said head part has a first accommodation section, a second accommodation section, and a third accommodation section; a ratchet member is positioned in said first accommodation section; a clamping piece is disposed in said second accommodation section; a change-over switch has at least one driven part disposed in said third accommodation section; and a resisting spring has a front resisting part, a middle resilience part, and a rear resisting part.

12 Claims, 9 Drawing Sheets

(56) References Cited

U.S. PATENT DOCUMENTS

2002/0112573 A1\* 8/2002 Hu ..................... B25B 13/463
  81/63.2
2006/0123954 A1\* 6/2006 Arnold ................ B25B 13/463
  81/63

\* cited by examiner

FIG. 1

( Prior Art )

FIG. 2

( Prior Art )

RATCHET WRENCH ACTUATOR STRUCTURE

BACKGROUND OF THE INVENTION

Field of the Invention

The present disclosure relates to a ratchet wrench structure, more particularly to a ratchet wrench actuator structure which is easily assembled for economic effect in manufacture.

Descriptions of the Related Art

Figure 1:
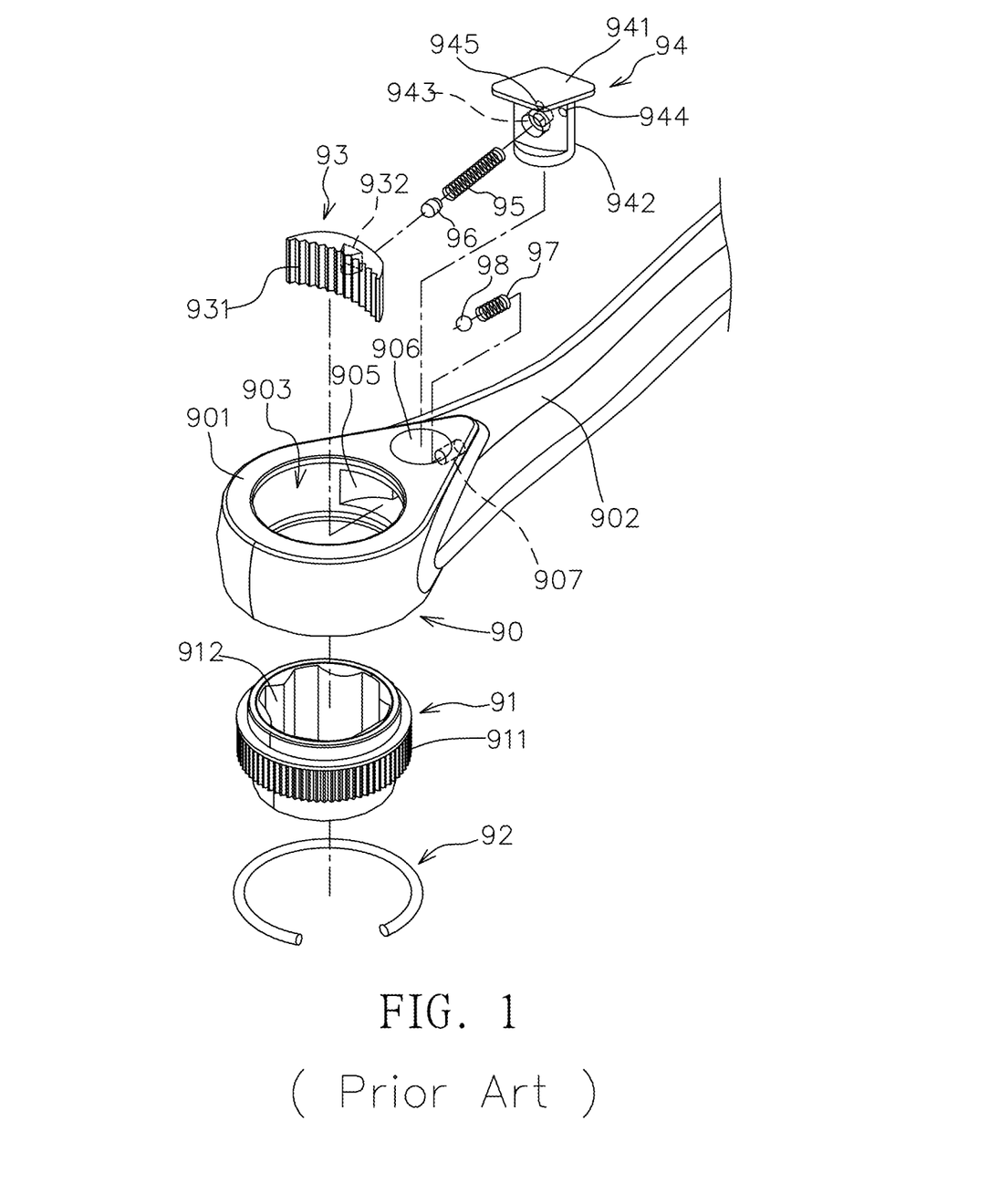
FIG. 1 is an exploded view illustrating a conventional ratchet wrench structure.
Figure 2:
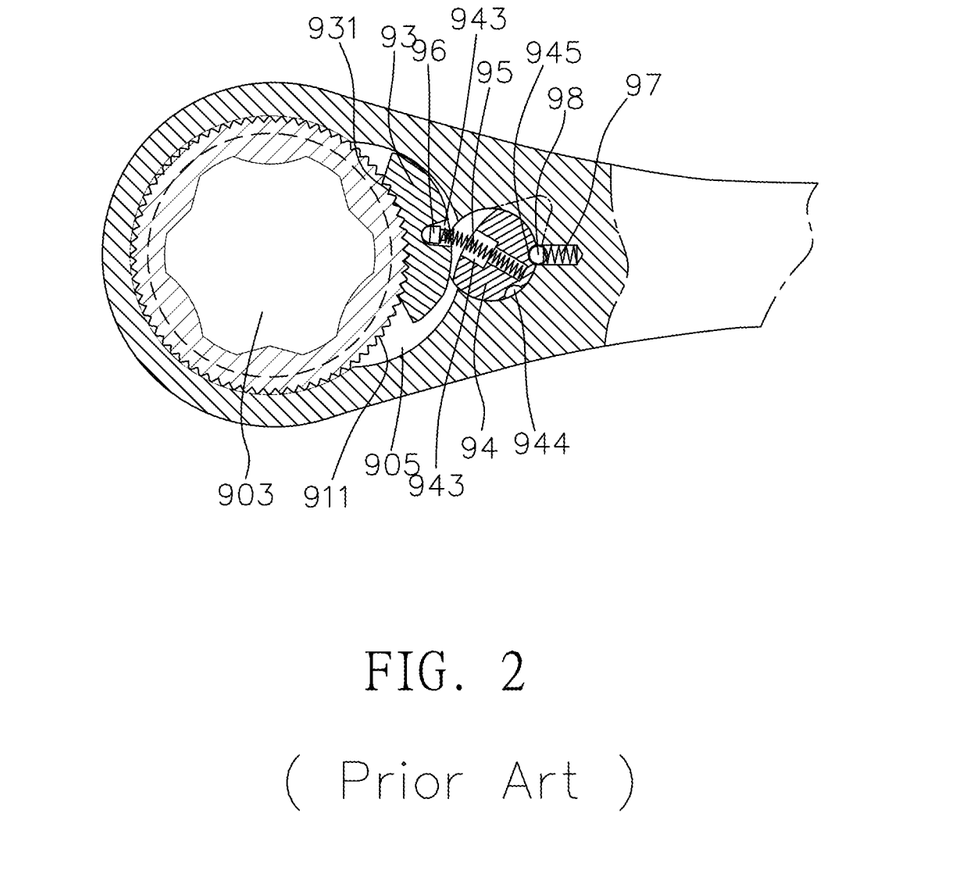
FIG. 2 is a sectional view illustrating a conventional ratchet wrench structure.
Figure 3:
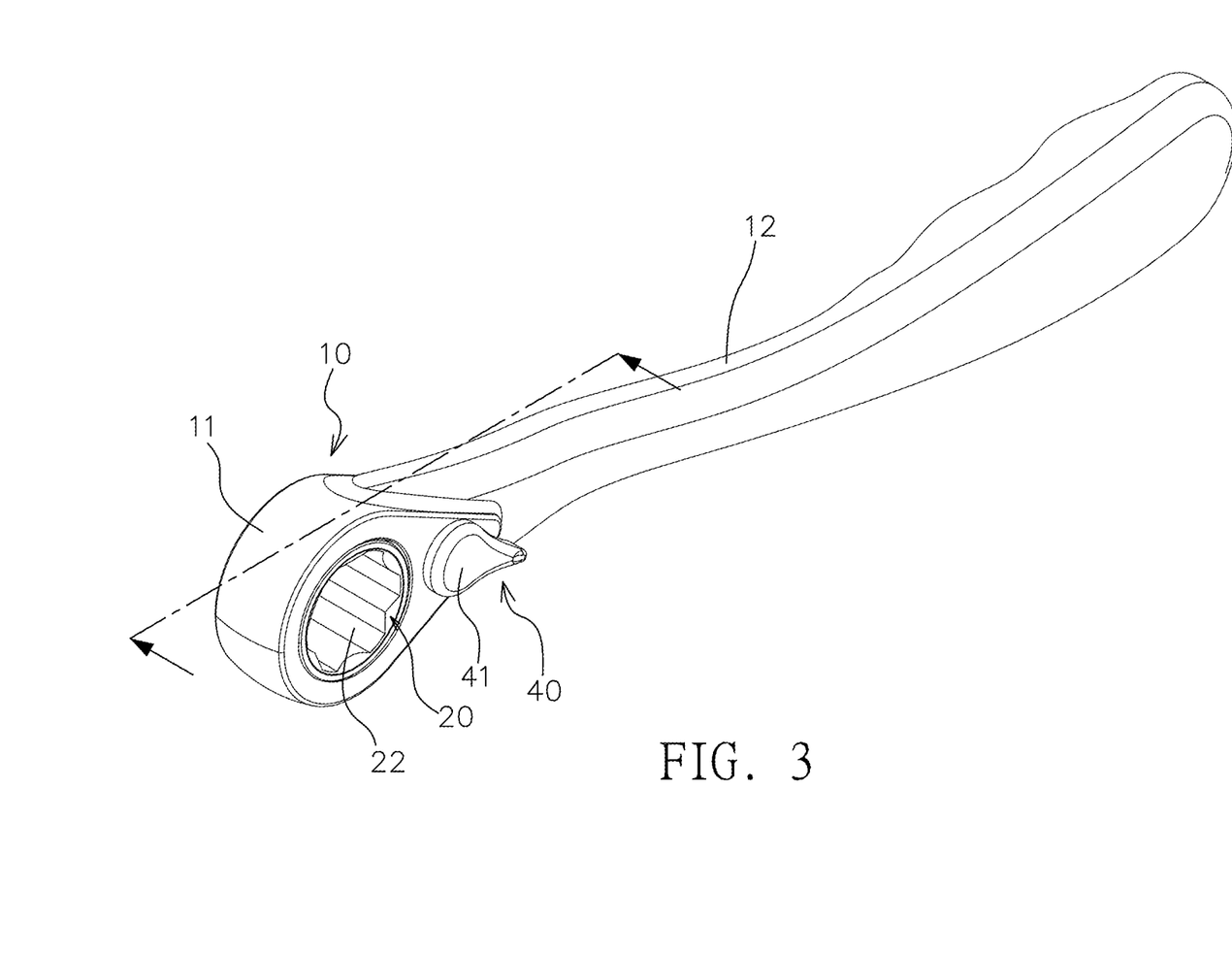
FIG. 3 is a perspective view illustrating a ratchet wrench actuator structure in service.
Figures 4, 4A:
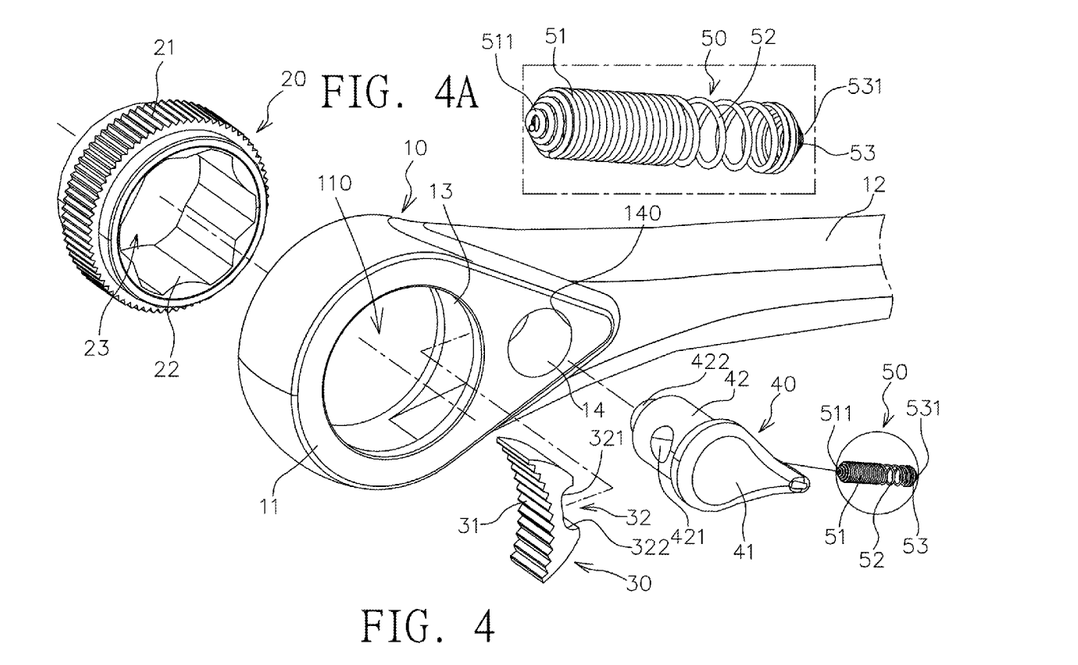
FIGS. 4 and 4A are an exploded view and a partial enlargement view respectively of the first embodiment of this invention.

The ratchet wrench is a common hand tool. The conventional ratchet wrench structure is as shown in FIGS. 1 and 2, this ratchet wrench 90 comprises: a head part 901 and a shank part 902, wherein the head part 901 contains a first accommodation section 903, a second accommodation section 905 is disposed in the shank part 902 and is connected with and close to the first accommodation section 903, a third accommodation section 906 is disposed at the rear end of the head part 901 and is vertically connected with the second accommodation section 905, an accommodation hole 907 is disposed at the rear end of this third accommodation section 906; a ratchet member 91, which has gear teeth 911 on the outer surface and a revolving member 912 on the inner surface, wherein the ratchet member 91 is wrapped around by a C-shaped stop ring 92 and then is disposed in the first accommodation section 903; a clamping piece 93, which is installed in the second accommodation section 905 and comprises a gear teeth 931 at the front end (opposite to the first accommodation section 903) thereof and an extended recess 932 at the rear end thereof; a change-over switch 94, which comprises a switching member 941 on the top and a driven part 942 at the bottom, wherein the driven part 942 is disposed in the third accommodation section 906, an accommodation hole 943 is disposed at the front end of the driven part 942, the accommodation section 943 is a serial hole, front bigger and rear smaller, a first pilot hole 944 and a second pilot hole 945 are disposed at the rear end of the driven part 942; a first spring 95, which is disposed in the accommodation hole 943 of the change-over switch 94, a resisting cap 96 urges the front end of the first spring 95 and forwards to the extended recess 932 of the clamping piece 93; a second spring 97, which is disposed in the accommodation hole 907, a steel ball 98 is disposed at the front end of the second spring 97 and forwards to the first pilot hole 944 or the second pilot hole 945 of the change-over switch 94 (the driven part 942). For the changing operation of the ratchet wrench 90, the change-over switch 94 should be turned to drive clamping piece 93 in the second accommodation section 905, in order to change the position for controlling and changing the rotation direction of the ratchet member 91. After the rotation being completed, the first pilot hole 944 or the second pilot hole 945 at the back part of the change-over switch 94 provides resilient resist for the steel ball 98. Please refer to ROC Patent No. 413113 for more information.

The prior art controls and changes the rotation direction of the ratchet member 91 via the change-over switch 94, drawbacks are still there. For example, the front side of the change-over switch 94 is disposed the first spring 95 and the resisting cap 96 so as to form the ratchet wrench 90, therefore the clamping piece 93 can be driven, the rear side of the change-over switch 94 is disposed the second spring 97 and the steel ball 98 for resistance and positioning. Since this means contains many components, the assembly operation will be more complicated and inconvenient, and take more time; obviously, it is not ideal design of construction.

Furthermore, the accommodation hole 943 on the change-over switch 94 is a tapered buried hole, big at the front part and small at the back part, this is disadvantageous to manufacture and necessary to be improved. Accordingly, how to avoid the drawbacks in manufacturing and assembling a conventional ratchet wrench should be an important topic to be overcome by the person skilled in the art.

Since the inventor has considered disadvantages in manufacturing and assembly on the conventional ratchet wrench and the fact of unideal structural design, the inventor has proceeded to develop the solution, and hope can develop one kind of a ratchet wrench actuator structure which is more convenient and economic for manufacturing and assembly, it can serve the public and promote the development of this industry; therefore, the inventor thought for a long time, then this invention was born.

SUMMARY OF THE INVENTION

The object of the present disclosure is to provide a ratchet wrench actuator structure, using the simple construction to control and decide the rotation direction of a ratchet wrench and further to achieve the excellent convenience and economic effect for manufacturing and assembly.

The other object of the present disclosure is to provide a ratchet wrench actuator structure, it can help the operation of change and rotation direction of a ratchet wrench to have integral co-movement and operation feeling of better rotation and positioning, and further to promote useful firmness and product competitiveness.

The technical measures used in the ratchet wrench actuator structure for the above purposes comprises: a ratchet wrench, which has a head part and a shank part, said head part has a first accommodation section, a second accommodation section is disposed at the rear end of said first accommodation section, said second accommodation section is connected with said first accommodation section, a third accommodation section is disposed at the rear end of said head part; said third accommodation section is vertically connected to said second accommodation section and having a rear end wall; a ratchet member, which is positioned in said first accommodation section and has outward gear teeth; a clamping piece, which is disposed in said second accommodation section, and has gear teeth at a front end of said clamping piece and at least one resisting recess at a rear end of said clamping piece; a change-over switch, which has at least a driven part, said driven part is disposed in said third accommodation section, a front end of said driven part has an accommodation hole, said accommodation hole axially penetrates through said driven part; and a resisting spring, which is installed in said accommodation hole and has a front resisting part at a front end of said resisting spring, a middle spring part at a middle part of said resisting spring, and a rear resisting part at a rear end of said resisting spring, said front resisting part contacts said resisting recess, said rear resisting part contacts said rear end wall.

In the ratchet wrench actuator structure, the resisting recess has a first resisting notch and a second resisting notch at this arc ends respectively.

In the ratchet wrench actuator structure, the change-over switch has a switching member at a top of said driven part, the switching member is shaped as a handle corresponding to said driven part, another end of said driven part corresponding to the switching member has a positioning column.

In the ratchet wrench actuator structure, the front resisting part and said rear resisting part have a plurality of spring coils with intensive layout and said middle resilience part has a plurality of spring coils with sparse layout.

In the ratchet wrench actuator structure, two end head parts of said front resisting part and said rear resisting part have an arc tapered resisting head respectively.

In the ratchet wrench actuator structure, a front side of said rear resisting part is partially disposed in said accommodation hole.

In the ratchet wrench actuator structure, the rear resisting part urges a steel ball.

In the ratchet wrench actuator structure, the front resisting part urges a resisting cap.

In the ratchet wrench actuator structure, the resisting cap has a junction part, a rear end of the junction part has a smaller diameter, and a curved head, a front end of the curved head has a greater diameter.

In the ratchet wrench actuator structure, the rear end wall of the third accommodation section has at least one resisting groove.

In the ratchet wrench actuator structure, the resisting groove has a first resisting groove and a second resisting groove, the two grooves are at both sides of the resisting groove or other proper locations.

In the ratchet wrench actuator structure, the resisting cap can be a hollow column with one closed end and one open end.

For technical features and effects in terms of the present disclosure completely comprehended and recognized by the reviewers, the preferred embodiments and accompanying drawings are thoroughly described hereinafter.

DETAILED DESCRIPTION OF THE PREFERRED EMBODIMENTS

Please refer to FIGS. 3, 4, 4A and 5, which illustrate a first embodiment of the ratchet wrench actuator structure of the present invention. The ratchet wrench actuator structure comprises: a ratchet wrench 10, a ratchet member 20, a change-over switch 40, and a resisting spring 50 in the first embodiment. The ratchet wrench 10 comprises a head part 11 and a shank part 12. The head part 11 has a first accommodation section 110, a second accommodation section 13 (a rear end) of the first accommodation section 110 is adjacent to and connected with the shank part 12. A third accommodation section 13 is disposed at a rear end of the head part 11. The third accommodation section 14 is vertically connected with the second accommodation section 13 (the vertical direction here is defined as a direction being vertical to an extended direction of the shank part). A rear end wall 140 is disposed at the third accommodation section 14 and is far away from the first accommodation section 110. In an alternative embodiment, the third accommodation section 14 is located in the shank part 12 depending on the shape of the head part 11. The ratchet member 20 is a hollow gear tooth body and is with an operating space 23, furthermore, the ratchet member 20 has a plurality of outward gear teeth 21 and a plurality of inward revolving members 22, and is positioned in the first accommodation section 110 of the head part 11, so that the plurality of gear teeth 21 are matched to the second accommodation section 13 correspondingly.

Moreover, the clamping piece 30 is a block shaped as a half moon and is disposed in the second accommodation section 13. A plurality of gear teeth 31 are disposed at a front surface (corresponding to the first accommodation section 110) thereof and a resisting recess 32 at a rear surface thereof. The gear teeth 31 are coupled with the gear teeth 21 of the ratchet member 20. The resisting recess 32 is opposite to the third accommodation section 14 and comprises a first resisting notch 321 and a second resisting notch 322 on both arc ends.

The change-over switch 40 comprises a switching member 41 atop and a driven part 42 underneath. The driven part 42 is shaped as a pillar and is disposed in the third accommodation section 14. The switching member 41 is shaped as a handle corresponding to the driven part. This is convenient for operating the change-over switch 40. An accommodation hole 421 is disposed at a front end of the driven part 42 and penetrates through the driven part 42 axially (the axial direction is defined as a direction parallel to the extended direction of the shank part). The front end of the accommodation hole 421 corresponds to the resisting recess 32, and the rear end of the accommodation hole 421 corresponds to the rear end wall 140 of the third accommodation section 14. Moreover, the driven part 42 (change-over switch 40) has a guide pin 422 at another end of the driven part 42. The guide pin 422 is held in a groove (not shown in figures) of an end opposite to the third accommodation section 14, in order to steadily operate the driven part 42 (change-over switch 40).

Figure 5:
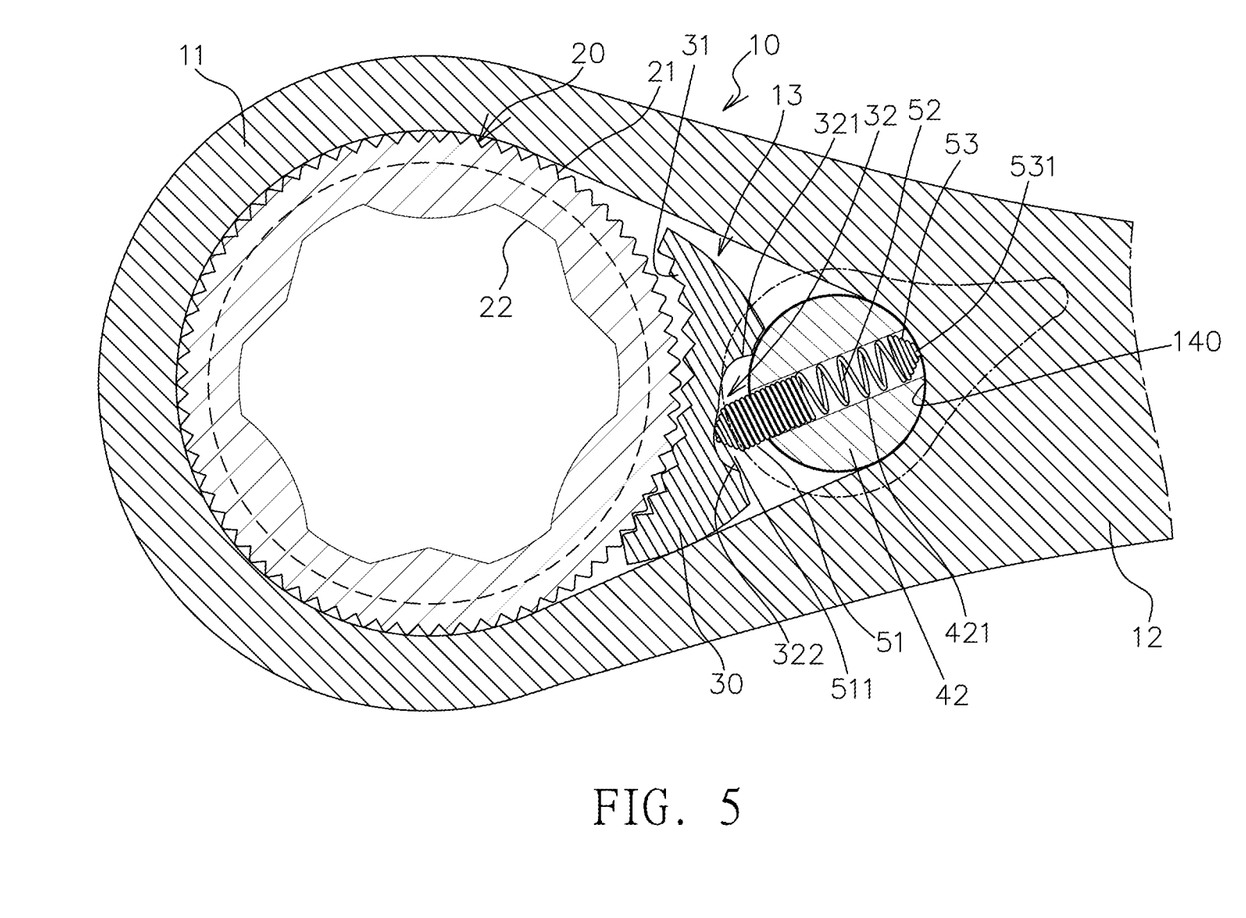
FIG. 5 is a sectional view of the first embodiment of the invention.

The resisting spring 50 is in an accommodation hole 421 of the change-over switch 40 (the driven part 42), and comprises a front resisting part 51 at a front end of the resisting spring 50, a rear resisting part 53 at a rear end of the resisting spring 50, and a middle resilience part 52 between the front resisting part 51 and the rear resisting part 53. The front resisting part 51 and the rear resisting part 53 have a plurality of spring coils with intensive layout for increasing the resisting strength; the middle resilience part 52 has a plurality of spring coils with sparse layout for stretch force. In an embodiment, the two end head parts of said front resisting part 51 and said rear resisting part 53 have an arc tapered resisting head 511 and another arc tapered resisting head 531, so that the resisting spring 50 is conveniently stretched and contacted. In a preferred embodiment, the front resisting part 51 allows the rear side to be partially accommodated in the accommodation hole 421 for stable actuation when the resisting spring 50 is disposed in the accommodation hole 421. The front resisting part 51 of the resisting spring 50 forwardly contacts the resisting recess 32 (e.g., the first resisting notch 321 or the second resisting notch 322) on the clamping piece 30. The rear resisting part 53 of the resisting spring 50 backwardly contacts the rear end wall 140 of the third accommodation section 14 (as shown in FIG. 5). In a preferred embodiment, the rear resisting part 53 allows the front side thereof to be partially accommodated in the accommodation hole 421 for stable actuation when the resisting spring 50 is disposed in the accommodation hole 421.

According to the above descriptions, the front resisting part 51 and the rear resisting part 53 in the resisting spring 50 having the plurality of spring coils with intensive layout is for a closer adherence of two adjacent spring coils, and the middle resilience part 52 having the plurality of spring coils with sparse layout is for an interval arrangement of two adjacent spring coils, the distance of the interval arrangement is at least half of a single spring coil's diameter.

For the ratchet wrench 10 being reversely rotated, the switching member 41 should be turned and drives the change-over switch 40 (the driven part 42), and further that the resisting spring 50 in the change-over switch 40 is spun as well. Simultaneously, the activated front resisting part 51 is shifted between the first resisting notch 321 and the second resisting notch 322 and finally contacts the first resisting notch 321 or the second resisting notch 322 as per rotation direction of the switching member 41 because the front resisting part 51 of the resisting spring 50 resists the resisting recess 32 on the clamping piece 30. Furthermore, the clamping piece 30 is driven by the activated front resisting part 51 and will be shifted to another flexible position in order to control and decide the rotation direction of the ratchet member 20. Likewise, the rear resisting part 53 is driven by the actuated change-over switch 40 and is shifted on the rear end wall 140 in order to make the rear end of the resisting spring 50 resiliently resisted and fixed, since the rear resisting part 53 of the resisting spring 50 contacts the rear end wall 140 of the third accommodation section 14.

By the above described construction, the accommodation hole 421 of the change-over switch 40 penetrates through the driven part 42, and the unique resisting spring 50 represents the assembly means of the denser front resisting part, the rear resisting part 53 and the more alienated middle resilience part 52; therefore, the accommodation hole 421 on the change-over switch 40 is very simple, it only needs one resisting spring 50 to proceed flexible resisting action without the components like spring, resisting cap, steel ball, etc., it not only saves the cost of components, but can provide easier, faster assembly operation. For making the ratchet wrench 10, it can achieve the excellent economic effect. The resisting spring 50 moves by, the rotating and changing the position at the front end of the resisting spring 50 and locking positioning at the rear end of the resisting spring 50 contain co-movement and better operation feeling, it extends the service life and promotes the practicability.

Figures 6, 6A:
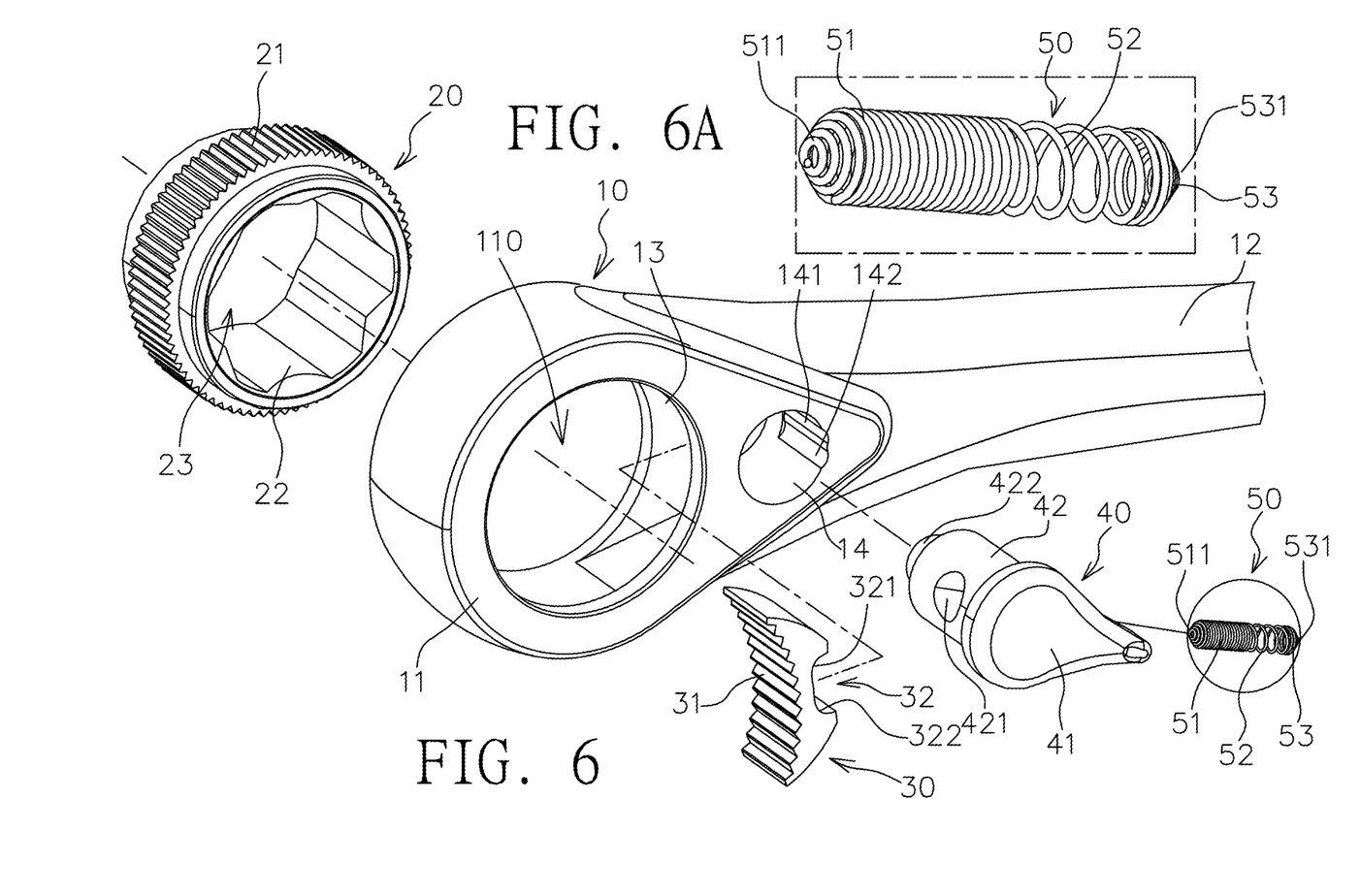
FIGS. 6 and 6A are a sectional view and a partial enlargement view respectively of the second embodiment of this invention.
Figure 7:
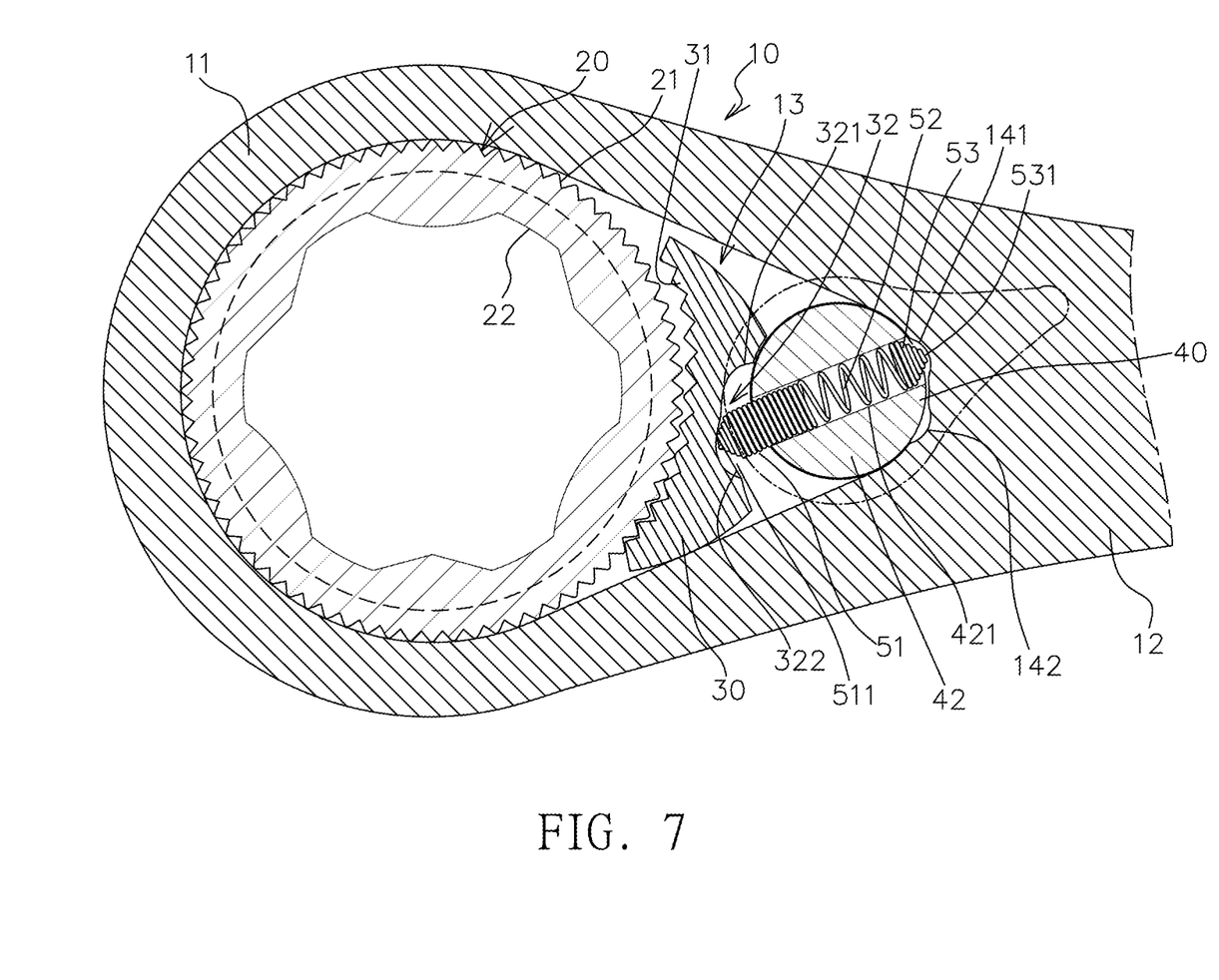
FIG. 7 is a sectional view of the second embodiment of this invention.

Please refer to FIGS. 6, 6A and 7, which illustrate a second embodiment of the ratchet wrench actuator structure of the present invention, it is based on the first embodiment and the changed design, but the difference is a first resisting groove 141 and a second resisting groove 142 are separately disposed at the rear end wall 140 of the third accommodation section 14, or integrated as one resisting groove with the a turning space therein, that is, the integrated resisting groove includes the first resisting groove 141 and the second resisting groove 142 at two opposite sides or other proper positions. The first resisting groove 141 and the second resisting groove 142 included in the integrated resisting groove are analogous to two curved ends of the resisting recess 32 (i.e., the first resisting notch 321 and the second resisting notch 322). Likewise, the rear resisting part 53 driven by the actuated change-over switch 40 is shifted between the first resisting groove 141 and the second resisting groove 142, and resists the first resisting groove 141 or the second resisting groove 142 as per rotation of the switching member 41 clockwise or counterclockwise, and makes the rear end of the resisting spring 50 resiliently resisted and fixed because the rear resisting part 53 of the resisting spring 50 contacts the first resisting groove 141 or the second resisting groove 142.

Figures 8, 8A:
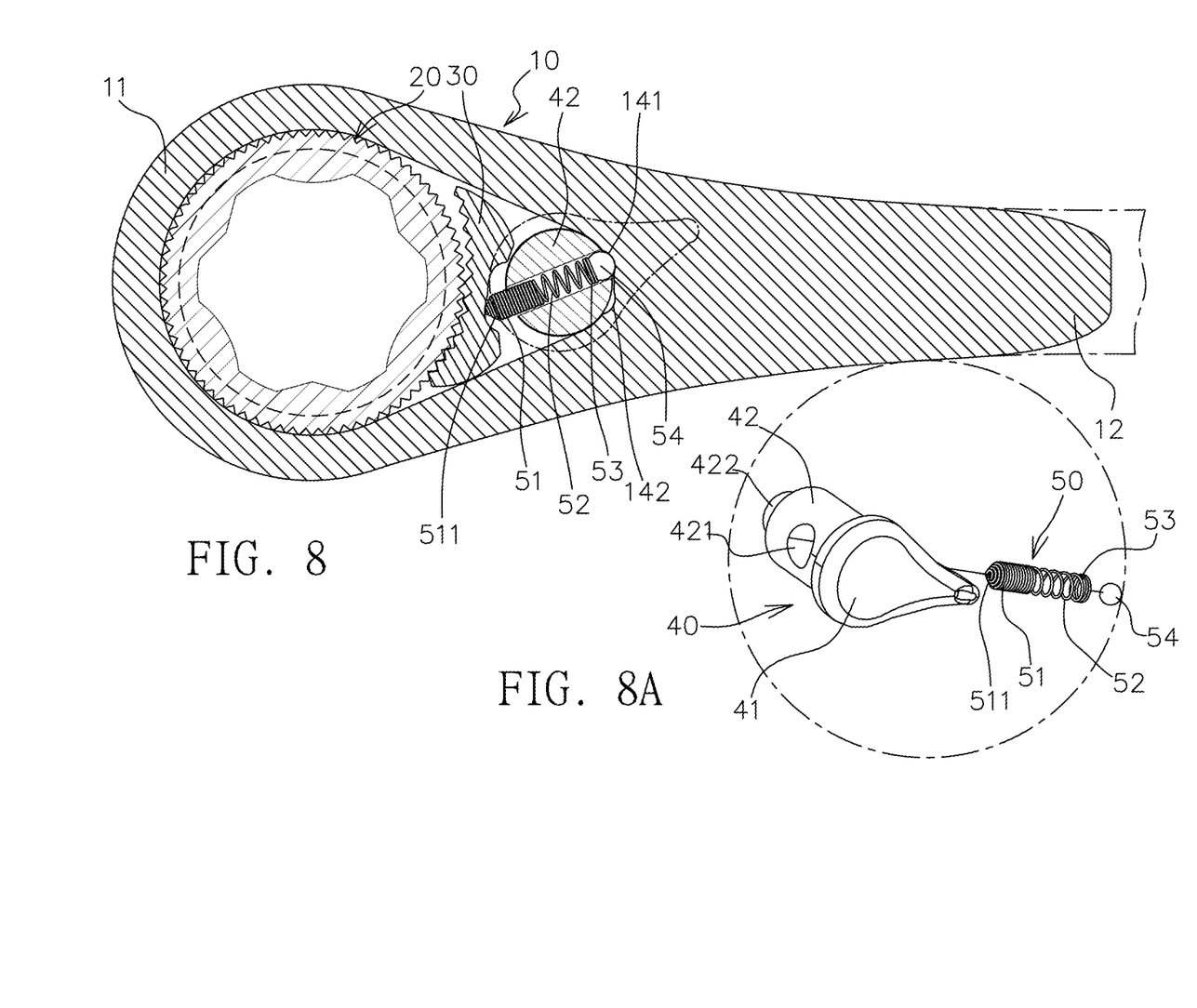
FIGS. 8 and 8A are a sectional view and a partial enlargement view respectively of the third embodiment of this invention.

Please refer to FIGS. 8 and 8A, which illustrate a ratchet wrench actuator structure of the present disclosure in the third embodiment based on the first or the second embodiment but different from the first or the second embodiment as shown hereinafter. A steel ball 54 urging the rear resisting part 53 of the resisting spring 50 substitutes for the arc tapered resisting head 531 in the first or the second embodiment, depending on stretch (compression) of the resisting spring 50 to contact the first resisting groove 141 or the second resisting groove 142 and allowing the rear end of resisting spring 50 to be resiliently resisted and fixed.

Figures 9, 9A, 9B:
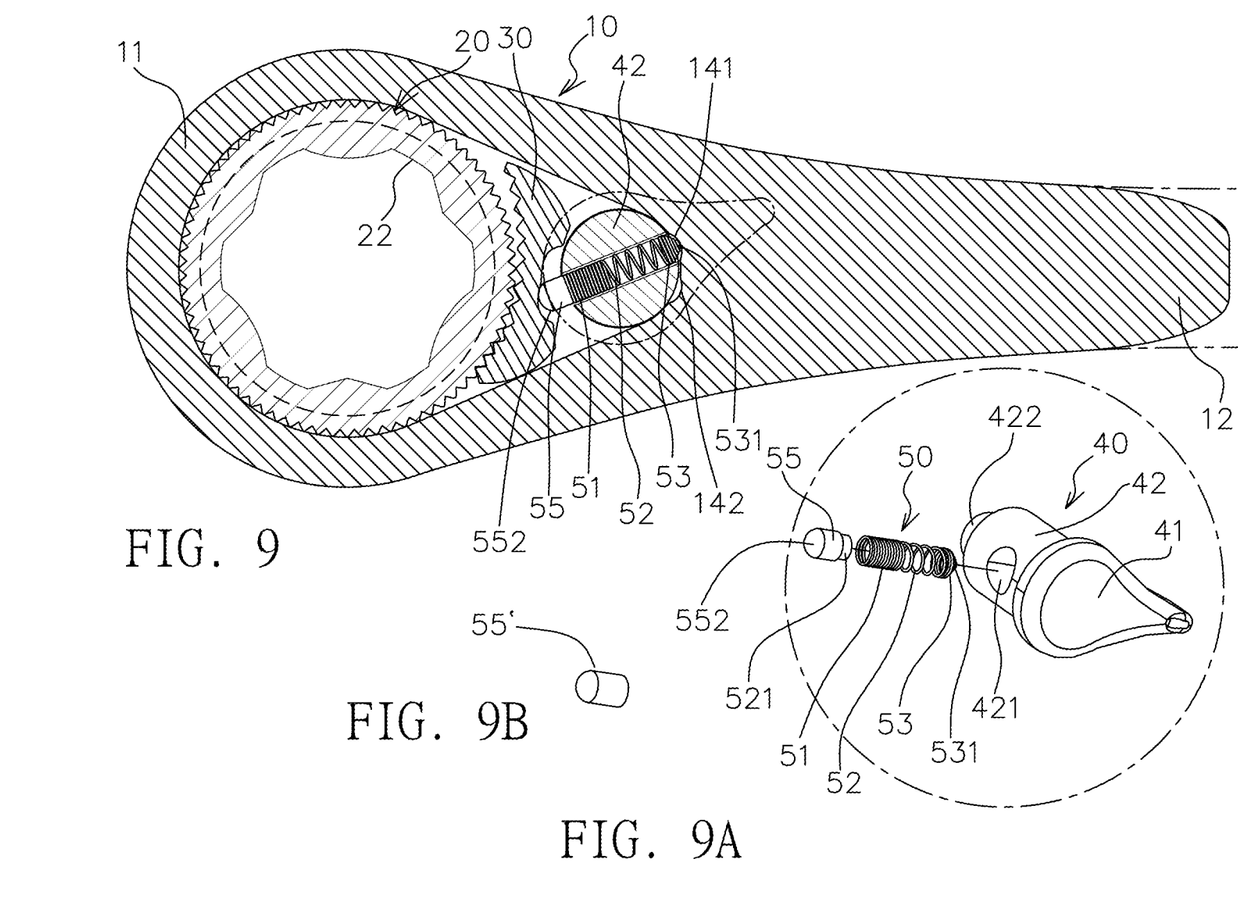
FIGS. 9, 9A and 9B are a sectional view, a partial enlargement view and a schematic view of an alternative resisting cap respectively of the fourth embodiment of this invention.

Please refer to FIGS. 9, 9A and 9B, which illustrate a ratchet wrench actuator structure of the present disclosure in the fourth embodiment based on the first or the second embodiment but different from the first or the second embodiment hereinafter. A resisting cap 55 urging the front resisting part 51 of the resisting spring 50 develops a junction part 521, a rear end of the junction part 521 has a smaller diameter, and a curved head 552, a front end of the curved head 552 has a greater diameter, wherein the junction part 521 contacting the front resisting part 51 substitutes for the tapered resisting head 511 in the first embodiment. Alternatively, the resisting cap 55 can be replaced by a different-shaped resisting cap 55' with a hollow columnar body, a closed end and an open end as shown in FIG. 9B. The resisting cap 55 or the resisting cap 55' held in the front resisting part 51 in use will resist the first resisting notch 321 or the second resisting notch 322 and simultaneously drive the clamping piece 30, which can be shifted to another location for controlling and deciding rotation of the ratchet member 20 clockwise or counterclockwise, when the resisting spring 50 is stretched or compressed.

In practice, a resisting cap (steel ball) installed at the front end (rear end) of the resisting spring in the present disclosure further contributes to manufacture and assembly of the ratchet wrench actuator structure without any redundant spring. In the present disclosure, a ratchet wrench actuator structure based on a simple structure features a ratchet wrench, which is easily rotated clockwise or counterclockwise and realizes convenient manufacture, assembly and economic effect. Moreover, the ratchet wrench which can be flexibly rotated, driven and fixed during operation has satisfactory practicability and product competitiveness.

Accordingly, a ratchet wrench actuator structure in the present disclosure meets patentability. However, the above descriptions are preferred embodiments which do not limit the scope of the ratchet wrench actuator structure; any equivalent change or improvement without departing from spirit of the present disclosure should be incorporated in claims herein.

What is claimed is:

1. A ratchet wrench actuator structure comprising:
   a ratchet wrench having a head part and a shank part, said head part having a first accommodation section, a second accommodation section being disposed at the rear end of said first accommodation section, said second accommodation section being connected with said first accommodation section, a third accommodation section being disposed at the rear end of said head part, said third accommodation section being vertically connected with said second accommodation section and having a rear end wall;
a ratchet member being positioned in said first accommodation section and having outward gear teeth;
a clamping piece being disposed in said second accommodation section, and having gear teeth at a front end of said clamping piece and at least one resisting recess at a rear end of said clamping piece;
a change-over switch having at least one driven part, said driven part being disposed in said third accommodation section, a front end of said driven part having an accommodation hole, said accommodation hole axially penetrating through said driven part; and
a resisting spring installed in said accommodation hole and having a front resisting part at a front end of said resisting spring, a middle resilience part at a middle part of said resisting spring, and a rear resisting part at a rear end of said resisting spring, said front resisting part contacting said resisting recess, said rear resisting part contacting said rear end wall;
said change-over switch has a switching member at a top of said driven part, the switching member being shaped as a handle corresponding to said driven part, another end of said driven part corresponding to the switching member having a guide pin;
said front resisting part and said rear resisting part have a plurality of spring coils with intensive layout and said middle resilience part has a plurality of spring coils with sparse layout;
said front resisting part and said rear resisting part in the resisting spring having the plurality of spring coils with intensive layout is for a closer adherence of two adjacent spring coils;
said middle resilience part in said resisting spring having the plurality of spring coils with sparse layout is for an interval arrangement of two adjacent spring coils, the distance of the interval arrangement being at least half of a single spring coil's diameter.

2. The ratchet wrench actuator structure according to claim 1, wherein said resisting recess has a first resisting notch and a second resisting notch at two arc ends respectively.

3. The ratchet wrench actuator structure according to claim 1, wherein two end head parts of said front resisting part and said rear resisting part have an arc tapered resisting head respectively.

4. The ratchet wrench actuator structure according to claim 1, wherein a rear side of said front resisting part is partially disposed in said accommodation hole.

5. The ratchet wrench actuator structure according to claim 1, wherein a front side of said rear resisting part is partially disposed in said accommodation hole.

6. The ratchet wrench actuator structure according to claim 1, wherein said rear resisting part urges a steel ball.

7. The ratchet wrench actuator structure according to claim 1, wherein said front resisting part urges a resisting cap.

8. The ratchet wrench actuator structure according to claim 7, wherein said resisting cap has a junction part, a rear end of the junction part has a smaller diameter, and a curved head, a front end of the curved head has a greater diameter.

9. The ratchet wrench actuator structure according to claim 7, wherein said resisting cap can be a hollow column with one closed end and one open end.

10. The ratchet wrench actuator structure according to claim 1, wherein said rear end wall is far away from said first accommodation section on said third accommodation section.

11. The ratchet wrench actuator structure according to claim 4, wherein said rear end wall further has at least one resisting groove.

12. The ratchet wrench actuator structure according to claim 1, wherein a first resisting groove and a second resisting groove are separately disposed at the rear end wall of the third accommodation section.

* * * * *